United States Patent Office 3,342,411
Patented Sept. 19, 1967

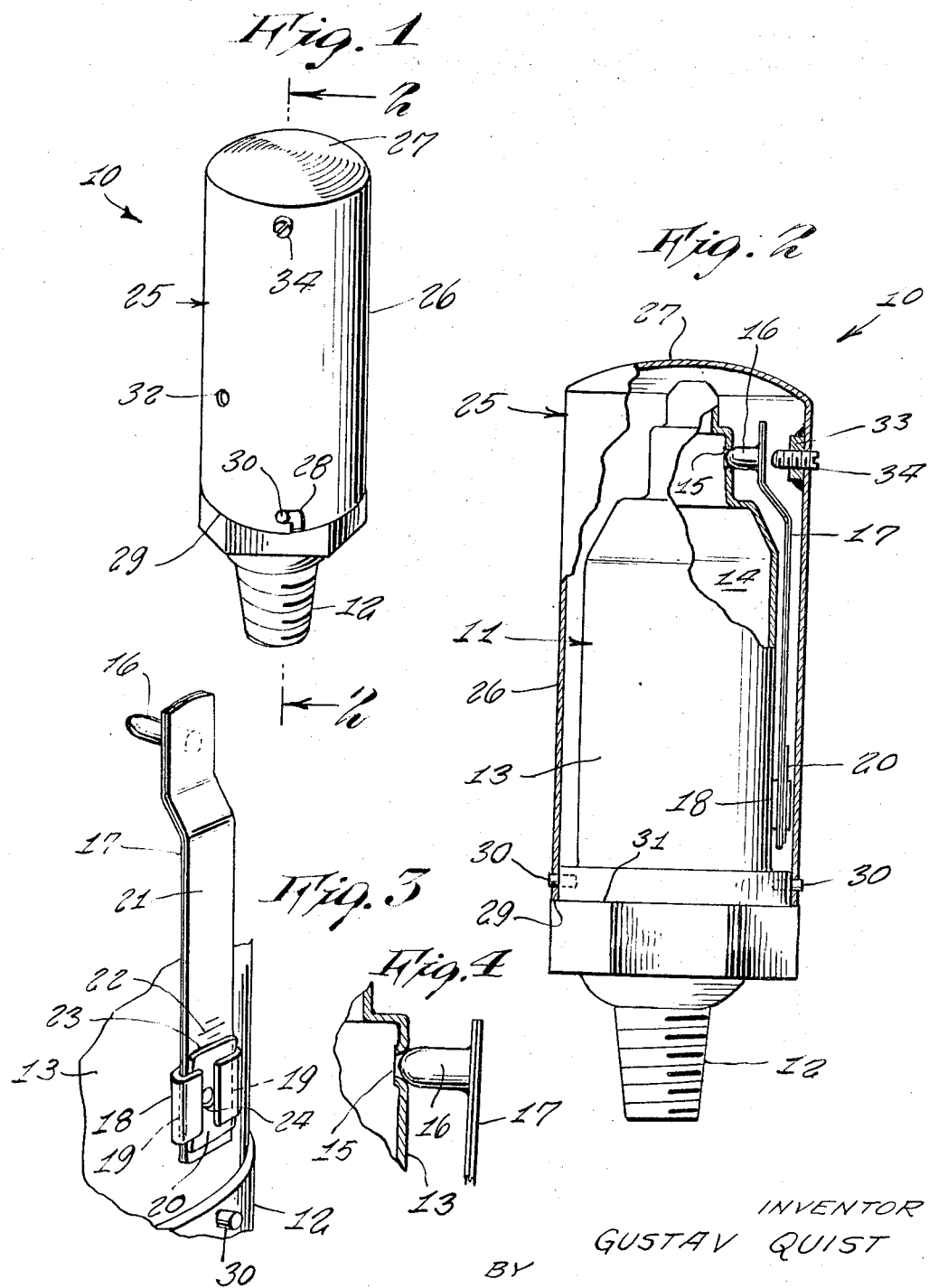

3,342,411
QUICK, LOW-PRESSURE VACUUM VALVE
Gustav Quist, 2866 Philip Ave., New York, N.Y. 10065
Filed Dec. 23, 1964, Ser. No. 420,829
2 Claims. (Cl. 236—66)

ABSTRACT OF THE DISCLOSURE

A quick, low-pressure vacuum valve used for venting air from radiators of steam heating systems, including a bi-metal spring secured to the outer side a conventional radiator valve having an opening to let out air, the spring having a slidable control to adjust the pressure against this opening of a tapered pin secured on the spring. An enclosing can cover carries a stop screw aligned with the pin to limit the amount of movement of the pin out of the hole under operating conditions.

---

This invention relates to low-pressure vacuum valves such as are used for the purpose of venting air from radiators of steam heating systems.

A principal object of the present invention is to provide a low-pressure vacuum valve for venting steam radiators and which has double acting spring means whereby it will control the air removal.

Another object is to provide a low-pressure vacuum valve as above described and wherein the double acting spring means are adjustable.

Another object is to provide a low-pressure vacuum valve employing a bi-metal spring having a tapered pin at one end receivable at selective pressure within a vent opening of a conventional radiator steam valve.

Yet another object is to provide a low-pressure vacuum valve employing a slidable plate adjustable relative to a graduated scale marked on the bi-metal spring, for selectively holding captive a greater or lesser length of the spring from freely bending due to temperature change, thus providing the adjustable means.

Yet another object is to provide a low-pressure vacuum valve incorporating an inverted can cover having a manually adjustable stop screw to regulate the limit of opening of the air vent in the valve.

Yet another object is to provide a low-pressure vacuum valve which has the quality of being quick to deliver heat to a room; which will prevent re-entry of air into a valve after a heating system has been shut off, thereby eliminating the quick cooling of a radiator; and which due to lack of air in the system will prevent water knocking caused by movement of air in radiators and pipes.

Yet a further object is to provide a low-pressure vacuum valve having a can cover serving as a muffler to diminish the sound of air leaving the system, and for the purpose of protectively enclosing the operative mechanism thereof.

Other objects are to provide a low-pressure vacuum valve which is simple in design, inexpensive to manufacture, rugged in construction, easy to use and efficient in operation.

These and other objects will be readily evident upon a study of the following specification and the accompanying drawing wherein:

FIGURE 1 is a perspective view of the present invention shown assembled,

FIGURE 2 is a cross-sectional view taken on line 2—2 of FIGURE 1,

FIGURE 3 is a perspective view of the bi-metal spring unit shown in FIGURE 2, and FIGURE 4 is an enlarged detail of a part of the structure shown in FIGURE 2, taken in the same plane.

Referring now to the drawing in detail, the reference numeral 10 represents a quick, low-pressure vacuum valve according to the present invention wherein there is a conventional radiator air valve member 11 having an externally threaded base 12 for securement to a radiator of a steam heating system, and a cylindrical element 13 integrally mounted on the base; the element having a hollow chamber 14 therein connected to a central opening extending through the base so as to allow movement of air from a radiator into the element 13.

An air vent 15 on a side of the element 13 is kept normally closed by a tapered pin 16 at the free end of a thermo-responsive bi-metal spring 17 rigidly affixed at its other end to a bracket 18 affixed to the side of element 13. The bracket is provided with grooves 19 on opposite sides for slidably retaining a slidable plate 20 adjacent the outer side 21 of the spring 17. A graduated scale 22 on the spring 17 provides visual means for slidable adjustment of the plate relative to the spring; the graduations of scale 22 being aligned with the edge 23 of the plate. A hole 24 in the plate 20 permits easy pushing of the plate with any sharp object fitted therein.

An inverted can cover 25 is fitted over the element 13 and the bi-metal spring assembly. The cover 25 is a hollow cylindrical member having a cylindrical side wall 26 and top wall 27. A pair of oppositely spaced bayonet slots 28 on the lower edge 29 receive pins 30 of the base for securement purpose of the cover adjacent a shoulder 31 of the base. A small port 32 on the cover permits escape outward of air from the valve 11. A block 33 secured to the side of wall 26 provides sufficient length for a threaded opening therethrough to receive a stop screw 34 which is in alignment with the tapered pin for purpose of limiting the outward movement of the pin and thus regulate for a correct size of opening of the air vent.

In operative use, when steam is developed in the boiler causing a pressure registration of two pounds on the boiler gauge, this pressure will overpower the force of the bi-metal spring that keeps the tapered pin against the seat of the air vent closing the opening. The pressure opens the air vent with a gap of approximately one-thirty-second of an inch between the seat and pin set by the stop screw, this opening being sufficient to let out the air from the valve so to allow the steam to enter the steam heating system and radiator. With the air removed from the radiator, steam behind the air may enter it, the heat of the steam causing the bi-metal spring to expand and thus slightly bend to cause the tapered pin to reseat itself with greater force within the vent opening, this great force being more than the low steam pressure thereby maintaining the air vent closed to keep the steam within the radiator.

After the thermostat shuts down the boiler operation, and the steam pressure drops again to zero, the pin will remain seated within the air vent due to the original setting thereof, thus preventing air to re-enter into the valve and entire system. Thus with no air having re-entered to cool the radiator there will be a conservation of heat therein. There will be no water knocking due to moist air moving within the radiator and pipelines when the steam heating system is again regenerated. All will be quiet. Due to lack of air within the system, there will be a saving on the use of fuel to accomplish this preliminary step. Instead, the initial fuel and steam will serve to directly heat the radiators. Not requiring to first push out air from the system, the steam will move more rapidly into the radiators thus providing quicker heat in the house.

In a larger building, radiators in a conventional system located farthest from the boiler take a longer time to receive steam and heat, and thus have less time to deliver heat before the system is again shut down; the rooms heated by such radiators accordingly being underheated relative to the remainder of the house. By adjusting the slidable plate over the bi-metal spring, all the radiators may be made to heat at the same time, thus providing more even heat throughout the house.

While various changes may be made in the detail construction, it is understood that such changes will be within the spirit and scope of the present invention, as is defined by the appended claims.

Having thus set forth and disclosed the nature of this invention, what is claimed is:

1. In a low-pressure vacuum valve for venting steam radiators, the combination of a valve member having a hollow cylindrical element secured on a base having an externally threaded portion for securement to a radiator, said base having a central opening extending therethrough to allow air from said radiator to enter within said hollow element, adjustable means for allowing movement outward of air from within said element and preventing of entry of air thereinto, and an inverted can cover for protecting enclosing said valve member element and said adjustable means, said can cover carrying means for selectively regulating the outward movement of said air from said element, said adjustable means comprises an air vent opening in a cylindrical side of said element, and a mechanism for selectively sealing said vent, said mechanism comprising a tapered pin fitted against said vent, said pin being secured to a free end of a thermo-responsive bi-metal spring, rigidly affixed at its opposite end to a bracket affixed on the side of said element, said bracket having a groove on opposite sides for slidably retaining a slidable plate adjacent the outer side of said spring, a graduated scale on said outer side of said spring for alignment with an edge of said plate, and an opening in said plate for easy pushing of said plate with any object fitted therein.

2. The combination as set forth in claim 1 wherein said can cover comprises a cylindrical hollow member having a cylindrical side wall and an upper end wall, the lower edge of said side wall defining an opening for receiving said valve element and said mechanism therewithin, a pair of oppositely spaced bayonet slots adjacent said lower edge, a pair of radially outwardly extending pins on said valve base being received within said bayonet slots, for securing said cover over said valve, a port in said cover side to allow escape outward of air received from said valve, and a stop screw threadingly carried by said cover in alignment with said tapered pin to provide said regulating means of said air from said valve element.

References Cited
UNITED STATES PATENTS

| | | | |
|---|---|---|---|
| 1,598,241 | 8/1926 | Chadeayne | 236—66 |
| 1,598,242 | 8/1926 | Chadeayne | 236—66 |
| 1,703,673 | 2/1929 | Jacobus | 236—66 |
| 1,956,003 | 4/1934 | Burrell | 236—66 |

ALAN COHAN, *Primary Examiner.*